United States Patent [19]
Schuett et al.

[11] Patent Number: 5,534,852
[45] Date of Patent: Jul. 9, 1996

[54] REMOTE SAFETY RELEASE MECHANISM

[76] Inventors: Craig L. Schuett; Patrick Showalter, both of 1300 Matterhorn Dr., Riverside, Calif. 92506

[21] Appl. No.: 412,973

[22] Filed: Mar. 29, 1995

[51] Int. Cl.⁶ ............................................. G08B 23/00
[52] U.S. Cl. ............................................. 340/573; 318/16
[58] Field of Search .................... 340/573, 825.69, 340/825.72; 200/318; 318/16; 403/325, 321; 119/720; 54/69

[56] References Cited

U.S. PATENT DOCUMENTS

| | | | |
|---|---|---|---|
| 3,733,530 | 5/1973 | Labart | 318/16 |
| 3,997,979 | 12/1976 | Turner | 35/29 R |
| 4,519,787 | 5/1985 | Williams | 446/313 |
| 4,898,119 | 2/1990 | Tsai | 119/29 |
| 4,909,658 | 3/1990 | Townsend | 403/325 |
| 4,919,082 | 4/1990 | Tsai | 119/29 |

*Primary Examiner*—Brent A. Swarthout
*Assistant Examiner*—Albert K. Wong
*Attorney, Agent, or Firm*—Stetina Brunda & Buyan

[57] ABSTRACT

A remote controlled safety release mechanism comprising a housing having a latch member pivotally connected thereto and protruding therefrom. Attached to the housing is the first end of a strap, the second end of which is releasably attached to the latch member. Disposed within the housing is an actuation assembly which is mechanically coupled to the latch member and operable to selectively move the latch member between a locked position wherein the second end of the strap is maintained in attachment thereto and an unlocked position wherein the second end of the strap is released therefrom. The actuation assembly is adapted to receive a control signal, with the movement of the latch member between the locked and unlocked positions being facilitated by the selective transmission of the control signal to the actuation assembly.

4 Claims, 1 Drawing Sheet

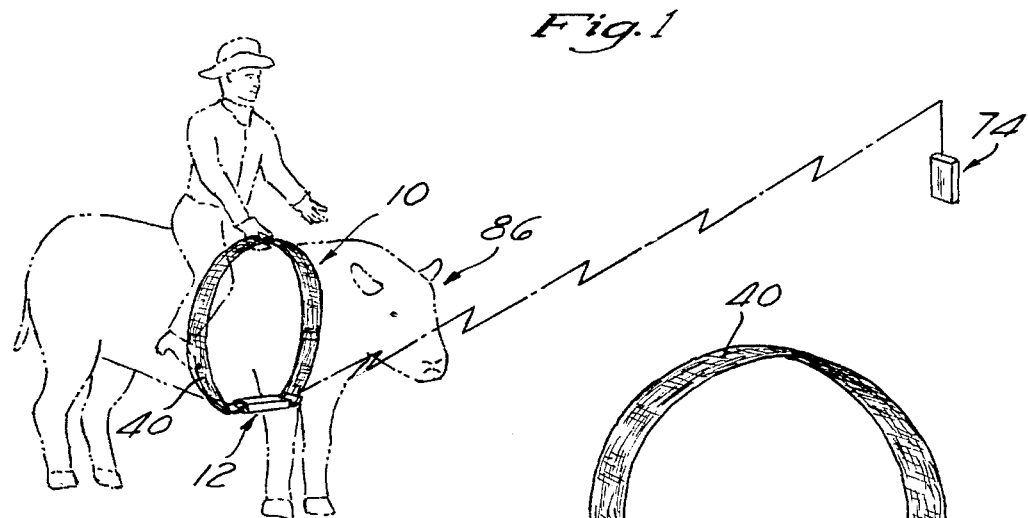
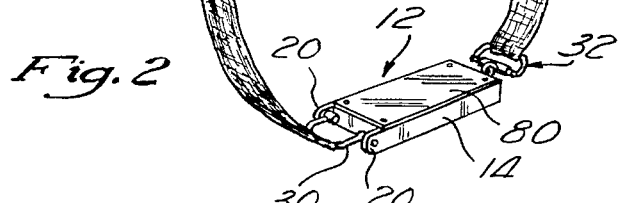
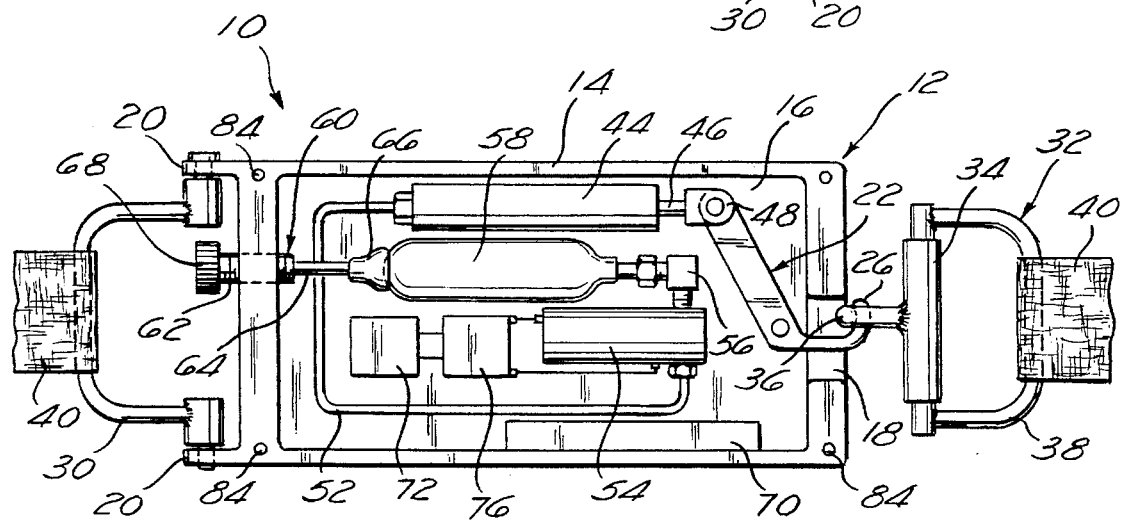

REMOTE SAFETY RELEASE MECHANISM

FIELD OF THE INVENTION

The present invention relates generally to safety devices, and more particularly to a remote controlled safety release mechanism for use in the rodeo and stunt industries for preventing a rider from becoming accidentally tied to a bucking animal.

BACKGROUND OF THE INVENTION

In the United States and throughout the world, rodeos are becoming an increasingly popular form of entertainment. Of all the sporting events which typically take place at a rodeo, the most exciting are arguably the bull and/or bronco riding competitions. However, these particular events are also the most dangerous and pose the most serious risks to the rider in that the rider is extremely susceptible to being severely injured, particularly when in the process of or immediately after being thrown from the back of the bucking animal.

In most bull and bronco riding competitions, the animal is ridden "bareback" (i.e., without a saddle). In this respect, the bull or bronco is provided with only a cinch strap which is tightly wrapped about the animal and extends about its back and chest in close proximity to its front legs. The rider, after being seated upon the back of the animal, usually wedges one hand underneath the top of the cinch strap, with the palmar surface of the hand facing upwardly and the cinch strap being tightly grasped thereby. In certain bronco riding competitions, the animal is provided with a saddle which is secured to its back in a conventional manner. When a saddle is utilized, a flank strap is wrapped about the loin of the bronco just forward the rear legs thereof. However, the flank strap is typically not wrapped as tightly around the saddled bronco as the cinch strap. After the rider is seated within the saddle, the flank strap is tightened to cause the animal to start bucking.

Since one of the rider's hands is wedged under the cinch strap, severe injuries most often occur when the rider is thrown from the bucking animal and his or her hand gets caught or trapped under the cinch strap. As will be recognized, the inability of the rider to free his or her hand from the strap after being thrown from the bucking animal often results in the rider being kicked, trampled or dragged by the animal, thus resulting in severe injury or even death. Additionally, because the cinch strap or flank strap remains tightly bound about the animal after the rider has been thrown, the animal can experience extreme distress which can thus cause the animal to suffer severe psychological trauma.

The present invention is intended to substantially reduce occurrences of injury to a rider attributable to his or her hand being caught in a cinch strap after being thrown from a bucking animal as well as reduce the stress a bucking animal experiences as a result of wearing either a cinch or flank strap. In this respect, the present invention comprises a safety release mechanism to which the opposed ends of the cinch or flank straps are attached. When the rider is in the process of being thrown from the bucking animal, a control signal may be sent from a remote, hand-held transmission unit which will facilitate the actuation of the release mechanism in a manner detaching the cinch or flank strap from the animal and, with respect to the cinch strap, allow the rider to escape therefrom.

SUMMARY OF THE INVENTION

In accordance with the present invention, there is provided a remote controlled safety release mechanism which comprises a housing having a latch member pivotally connected thereto and protruding therefrom. Pivotally connected to the housing is a first buckle, while releasably attached to the latch member is a second buckle which includes a first part adapted to receive a portion of the latch member and a second part rotatably connected to the first part. The first end of an elongate strap is secured to the first buckle, with the opposed second end of the strap being secured to the second part of the second buckle.

Disposed within the housing is an actuation assembly which is mechanically coupled to the latch member. The actuation assembly is operable to selectively move the latch member between a locked position wherein the second buckle is maintained in attachment thereto and an unlocked position wherein the second buckle is released therefrom. In this respect, the actuation assembly is adapted to receive a control signal from a hand-held transmission unit, with the movement of the latch member between the locked and unlocked positions being facilitated by the selective transmission of the control signal to the actuation assembly.

In the preferred embodiment, the actuation assembly comprises a pneumatic cylinder having a piston rod extending therefrom which is pivotally connected to the latch member. Fluidly connected to the cylinder is a fast acting solenoid valve, while fluidly connected to the solenoid valve is a pressurized fluid source which preferably comprises a carbon dioxide cartridge. Cooperatively engaged to the housing is a clamping member for maintaining the pressurized fluid source of the actuation assembly in fluid connection to the solenoid valve.

In addition to the foregoing, the actuation assembly includes a power supply which preferably comprises a 12 volt battery. Electrically connected to the power supply is a signal receiving module for receiving the control signal transmitted to the actuation assembly. Also electrically connected to the power supply as well as the signal receiving module and solenoid valve is a switching module for selectively channeling power from the power supply to the solenoid valve upon the transmission of the control signal to the signal receiving module.

BRIEF DESCRIPTION OF THE DRAWINGS

These, as well as other features of the present invention, will become more apparent upon reference to the drawings wherein:

FIG. 1 is a perspective view of the safety release mechanism of the present invention as operatively secured to a bucking animal, and accompanying remote control signal transmission unit;

FIG. 2 is a perspective view of the safety release mechanism shown in FIG. 1;

FIG. 3 is a top, cross-sectional view of the safety release mechanism, illustrating the latch member thereof in a locked position; and FIG. 4 is a partial top, cross-sectional view of the safety release mechanism, illustrating the latch member thereof in an unlocked position.

DETAILED DESCRIPTION OF THE PREFERRED EMBODIMENT

Referring now to the drawings wherein the showings are for purposes of illustrating a preferred embodiment of the present invention only, and not for purposes of limiting the same, FIGS. 1 and 2 perspectively illustrate the remote controlled safety release mechanism 10 constructed in accordance with the present invention. As best seen in FIGS. 2 and 3, the release mechanism 10 comprises a rectangularly configured housing 10 which is preferably fabricated from a metal material such as stainless steel or aluminum. The housing 12 itself comprises a main body portion 14 defining opposed lateral and longitudinal sides, and a recessed cavity 16. Formed within one of the lateral sides of the main body portion 14 is a notch 18, while extending outwardly from the other lateral side in spaced, parallel relation to each other is a pair of mounting ear portions 20, each of which is substantially flush with a respective longitudinal side of the main body portion 14.

Pivotally connected to the main body portion 14 of the housing 12 is a latch member 22. As best seen in FIGS. 3 and 4, the latch member 22 includes an elongate base portion 24 which resides within the cavity 16, and a hook portion 26 which extends through the notch 18 and protrudes from the main body portion 14. The pivotal connection of the latch member 22 to the main body portion 14 is facilitated by a first pivot pin 28 which is disposed between the base and hook portions 24, 26. Also pivotally connected to the main body portion 14, and in particular the mounting ear portions 20 thereof, are the opposed ends of a first generally U-shaped buckle 30.

In addition to the first buckle 30, the release mechanism 10 comprises a second generally D-shaped buckle 32 which is releasably attached to the latch member 22, and in particular the hook portion 26 thereof. In the preferred embodiment, the second buckle 32 itself comprises a first part 34 which includes an eyelet 36 adapted to receive the hook portion 26 of the latch member 22. Rotatably connected to the first part 34 is a second part 38. The first buckle 30 and second buckle 32 (including the first and second parts 34, 38) are preferably fabricated from stainless steel or aluminum as well, as is the latch member 22.

The release mechanism 10 constructed in accordance with the present invention further comprises an elongate strap 40 having a first end which is rigidly secured to the first buckle 30 and an opposed second end which is rigidly secured to the second part 38 of the second buckle 32. When the release mechanism 10 is intended to be secured to a bucking animal (i.e., a bronco or bull) which is to be ridden bareback, the strap 40 will typically comprise a "cinch strap". If, on the other hand, the release mechanism 10 is intended to be secured to a saddled animal, the strap 40 will typically comprise a "flank strap". Though, as shown in FIGS. 1–4, the strap 40 comprises a cinch strap, it will be recognized that the same may alternatively comprise a flank strap.

In the preferred embodiment, the latch member 22 is selectively movable between a locked position (shown in FIG. 3) wherein the second buckle 32, and in particular the first part 34 thereof, is maintained in attachment thereto, and an unlocked position (shown in FIG. 4) wherein the second buckle 32, and hence the strap 40, is released therefrom. The movement of the latch member 22 between the locked and unlocked positions is facilitated by a pneumatically controlled actuation assembly 42 mechanically coupled thereto which is disposed within the cavity 16 of the main body portion 14.

As best seen in FIG. 3, the actuation assembly 42 comprises a pneumatic cylinder 44 having a piston rod 46 extending axially therefrom. The pneumatic cylinder 44 includes an internal spring which biases the piston rod 46 to the retracted position shown in FIG. 3. Disposed on the distal end of the piston rod 46 is a clevis bracket 48 which is pivotally connected to the base portion 24 of the latch member 22 via a second pivot pin 50. Fluidly connected to the pneumatic cylinder 44 via an elongate fluid line 52 is the outlet port of a fast acting poppet style solenoid valve 54. Fluidly connected to the inlet port of the solenoid valve 54 via an elbow fitting 56 is a pressurized fluid source 58 which preferably comprises a carbon dioxide cartridge. In this respect, though not shown, the end of the elbow fitting 56 opposite that attached to the inlet port of the solenoid valve 54 includes a piercing tip which is adapted to puncture a metallic diaphragm disposed on one end of the fluid source 58 in a manner placing the same into fluid communication with the inlet port of the solenoid valve 54. When the pressurized fluid source 58 is properly connected to the elbow fitting 56, a seal is formed therebetween which prevents the leakage of any pressurized fluid into the cavity 16. Upon the depletion of the pressurized fluid from within the fluid source 58, the same is simply detached from the elbow fitting 56 and replaced with a new, fully charged fluid source 58. Such detachment is typically accomplished by pulling the fluid source 58 toward the lateral side of the main body portion 14 furthest from the elbow fitting 56.

To ensure that the fluid source 58 is maintained in fluid connection to the elbow fitting 56 and not accidentally disengaged therefrom, the release mechanism 10 is preferably provided with a clamping member 60 which is cooperatively engaged to the main body portion 14 of the housing 12. The clamping member 60 comprises an externally threaded shaft portion 62 which is received into a complimentary internally threaded aperture disposed within the lateral side of the main body portion 14 extending between the mounting ear portions 20. Extending axially from the shaft portion 62 into the cavity 16 is a reduced diameter rod portion 64 having a generally bell-shaped end cap 66 attached to the distal end thereof. As seen in FIG. 3, the end cap 66 defines a generally concave end surface which is formed so as to be complimentary to the arcuate contour of the end of the fluid source 58 opposite that which is fluidly connected to the elbow fitting 56. Attached to the end of the shaft portion 62 opposite that including the rod portion 64 extending therefrom is an enlarged head portion 68 which is externalized (i.e., not disposed within the housing 12).

The clamping member 60 is used to maintain the fluid source 58 in fluid connection to the elbow fitting 56 by rotating the same in a clockwise direction via the head portion 68 so as to cause the end cap 66 to seat firmly against the end of the fluid source 58. As will be recognized, when the clamping member 60 is tightened in the aforementioned manner, the fluid source 58 is, in effect, compressed between the end cap 66 and elbow fitting 56, thus preventing the fluid source 58 from being inadvertently disconnected from the elbow fitting 56. When it is desired to replace the fluid source 58, the head portion 68 of the clamping member 60 is rotated in a counter-clockwise direction, thus causing the end cap 66 to move axially away from the fluid source 58 which allows the same to be pulled out of engagement with the elbow fitting 56 in the aforementioned manner. Once a new fluid source 58 is fluidly connected to the elbow fitting 56, the head portion 68 is once again rotated in a clockwise direction, thus causing the end cap 66 to firmly seat against the end of the replacement fluid source 58.

The actuation assembly 42 of the release mechanism 10 further includes a power supply 70 which extends along one of the longitudinal sides of the main body portion 14 and preferably comprises a 9 volt battery. Electrically connected to the power supply 70 is a signal receiving module 72 which is adapted to receive a control signal transmitted from a remote, hand-held transmission unit 74 (shown in FIG. 1). Also electrically connected to the power supply 70 as well as to the signal receiving module 72 and solenoid valve 54 is a switching module 76 which is adapted to selectively channel power from the power supply 70 to the solenoid valve 54 upon the transmission of the control signal from the transmission unit 74 to the signal receiving module 72. As best seen in FIG. 2, the various components comprising the actuation assembly 42 are encased within the housing 12, and more particularly the cavity 16, by a cover plate 80 removably attached to the main body portion 14 via four (4) screws 82 which are extensible into corresponding, internally threaded apertures 84 disposed within the corner regions of the main body portion 14.

Having thus described the components comprising the actuation assembly 42, the operation of the release mechanism 10 of the present invention will now be described. As will be recognized, prior to the attachment of the release mechanism 10 to a bucking animal such as the bull 86 shown in FIG. 1, the latch member 22 is actuated to the unlocked position (shown in FIG. 4), with the second buckle 32 being detached therefrom. The release mechanism 10 is attached to the bull 86 or other bucking animal such as a bronco by placing the housing 12 against the chest of the animal in close proximity to the front legs thereof. Thereafter, the strap 40 is wrapped around the animal, with the second buckle 32 being engaged to the latch member 22 via the extension of the hook portion 26 into the eyelet 36 of the first part 34. Thereafter, the latch member 32 is actuated to the locked position (shown in FIG. 3), thereby securing the second buckle 32, and hence the strap 40, thereto. If, during a ride on the bucking animal, it becomes apparent that the rider is being thrown therefrom, the latch member 22 is actuated to the unlocked position via the transmission unit 74, thus releasing the second buckle 32 therefrom and causing the release mechanism 10 to be detached from the bucking animal. Importantly, such detachment prevents the rider's hand from becoming accidentally entagled and trapped within the strap 40 after the rider has been thrown off the back of the bucking animal.

Referring now to FIGS. 3 and 4, in the release mechanism 10, the latch member 22 normally resides in the locked position. The movement of the latch member 22 from the locked position (shown in FIG. 3) to the unlocked position (shown in FIG. 4) is accomplished by the selective transmission of an unlocking control signal from the transmission unit 74 to the actuation assembly 42, and in particular the signal receiving module 72 thereof. In this respect, when the unlocking control signal is transmitted to the signal receiving module 72, the same generates a "go" signal to the switching module 76. Upon receiving the "go" signal, the switching module 76 "turns on" and channels electrical energy directly from the power supply 70 to the solenoid valve 54. Upon being energized by the power supply 70, the solenoid valve 54, which normally resides in a closed position, actuates to an open position, thus facilitating the flow of pressurized fluid from the fluid source 58 to the pneumatic cylinder 44 via the elbow fitting 56, solenoid valve 54 and fluid line 52. The pressurization of the pneumatic cylinder 44 overcomes the biasing force exerted by its internal spring and causes the piston rod 46 thereof to move axially outwardly to its extended position shown in FIG. 4, thus resulting in the clockwise rotation of the latch member 22 relative the first pivot pin 28. Importantly, the clockwise rotation of the latch member 22 causes the hook portion 26 thereof to swing toward one end of the notch 18, thus creating a sufficient gap for allowing the eyelet 36 to slide out of engagement with the hook portion 26 and facilitating the release of the second buckle 32 from the latch member 22. As will be recognized, the notch 18 is sized so as to accommodate the full range of movement of the hook portion 26 of the latch member 22.

The latch member 22 remains in the unlocked position until a locking control signal is transmitted from the transmission unit 74 to the signal receiving module 72. When the locking control signal is transmitted to the signal receiving module 72, the same generates a "stop" signal to the switching module 76. Upon receiving the "stop" signal, the switching module 76 "turns off", thus cutting off the supply of electrical energy from the power supply 70 to the solenoid valve 54. The resultant deactivation of the solenoid valve 54 causes the same to return to its normal, closed position, thus cutting off the fluid communication between the fluid source 58 and the pneumatic cylinder 44. Immediately upon the return of the solenoid valve 54 to the closed position, the pressurized fluid trapped within the pneumatic cylinder 44 and fluid line 52 is vented from the solenoid valve 54. Due to the action of its internal biasing spring, the venting of the pneumatic cylinder 44 causes the piston rod 46 to move axially inwardly to its retracted position, thus resulting in the counter-clockwise rotation of the latch member 22 relative the first pivot pin 28. Once the eyelet 36 has been extended over the hook portion 26, such counterclockwise rotation of the latch member 22 closes the gap between the hook portion 26 and the end of the notch 18, thus maintaining the second buckle 32 in attachment to the latch member 22. Importantly, when the latch member 22 is in the locked position, the same is capable of withstanding approximately 1,100 pounds of pressure applied to the hook portion 26 thereof, and will resist rotation to the unlocked position to such an applied pressure level.

Though, as shown in FIG. 1, the release mechanism 10 is secured to a bull 86, it will be recognized that the same may be secured to any bucking animal. As previously explained, the strap 40 included with the release mechanism 10 may comprise a cinch strap if the release mechanism 10 is to be used in relation to bareback riding, and may alternatively comprise a flank strap if the release mechanism 10 is to be secured to a saddled bucking animal. Since the movement of the latch member 22 between the locked and unlocked positions is facilitated by the selective transmission of locking and unlocking control signals to the signal receiving module 72 of the actuation assembly 42, the signal receiving module 72 may be specifically adapted to receive only certain, specially coded control signals so as to prevent the release mechanism 10 from being detached from the bucking animal during a ride by more than one transmission unit 74. In this respect, it is contemplated that any release mechanism 10 constructed in accordance with the present invention will include a unique signal receiving module 72 which is adapted to receive control signals solely from a corresponding, compatible transmission unit 74. Though the release mechanism 10 is primarily intended for use in rodeos, it may be used in the stunt industry as well.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A remote controlled safety release mechanism comprising:

an elongate strap having opposed first and second ends;

a housing, the first end of the strap being attached to the housing;

a latch member pivotally connected to and protruding from the housing, the second end of the strap being releasably attached to the latch member; and an actuation assembly disposed within the housing and mechanically coupled to said latch member, said actuation assembly being operable to selectively move the latch member between a locked position wherein the second end of the strap is maintained in attachment thereto and an unlocked position wherein the second end of the strap is released therefrom, said actuation assembly comprising:

a cylinder having a piston rod extending therefrom which is pivotally connected to said latch member;

a solenoid valve fluidly connected to said cylinder;

a pressurized fluid source fluidly connected to said solenoid valve;

a power supply;

a signal receiving module electrically connected to said power supply for receiving the control signal transmitted to the actuation assembly; and a switching module electrically connected to said power supply, said signal receiving module and said solenoid valve for channeling power from the power supply to the solenoid valve upon the transmission of the control signal to the signal receiving module;

said actuation assembly being adapted to receive a control signal, with the movement of the latch member between the locked and unlocked positions being facilitated by the selective transmission of the control signal to the actuation assembly.

2. The release mechanism of claim 1 wherein said pressurized fluid source comprises a carbon dioxide cartridge.

3. The release mechanism of claim 1 wherein said power supply comprises a 9 volt battery.

4. The release mechanism of claim 1 further comprising a clamping member cooperatively engaged to said housing for maintaining said pressurized fluid source in fluid connection to said solenoid valve.

* * * * *